UNITED STATES PATENT OFFICE.

RUFUS S. MERRILL, OF CAMBRIDGE, MASSACHUSETTS, ASSIGNOR, BY MESNE ASSIGNMENTS, TO WM. B. MERRILL, JOSHUA MERRILL, AND RUFUS S. MERRILL.

IMPROVEMENT IN HEAVY HYDROCARBON OILS FOR ILLUMINATION.

Specification forming part of Letters Patent No. 100,915, dated March 15, 1870; Reissue No. 7,096, dated May 2, 1876; Reissue No. 8,728, dated May 27, 1879; application filed April 4, 1879.

*To all whom it may concern:*

Be it known that I, RUFUS S. MERRILL, of Cambridge, in the county of Middlesex and State of Massachusetts, have invented a certain new and useful Heavy Illuminating-Oil, obtained from the distillation of coal, petroleum, shale, schist, &c.; and I hereby declare that the following is a full, clear, and exact description of the same.

It is well known to those skilled in the art of distilling petroleum and oil produced from coal, shale, and schist that when either of these substances is subjected to distillation a great difference exists in their respective boiling-points, and in the production of the various oils and spirits that come over during the process of distillation; and, first, there is always a considerable percentage of naphtha or volatile spirit, varying in gravity and boiling-point, some of it being so volatile that it is difficult to condense it by ordinary means. These spirits are termed "naphthas" or "benzoles," and usually embrace the portion coming over between 85° and 60°, Baumé's scale. They are too light, volatile, and dangerous to be generally used for burning in lamps, and are principally used for paint, varnish-making, and for carbureting atmospheric air for automatic gas machines, the article so used being known as "gasoline."

After the naphthas have been distilled off down, say, to 60° Baumé, there begins to come over an oil more fixed in character and of higher boiling-point, which oil is used as an illuminating-oil, and is burned in lamps provided with flat or round-wick kerosene-burners, and it constitutes from fifty to seventy per cent. of the products of distillation. In other words, when the distillation is continued from 60° Baumé to about 40° Baumé the light thin oil that comes over between these degrees Baumé is about sixty per cent. of the petroleum from which the naphtha has been removed. These oils have been universally used for burning in lamps for illuminating purposes, and are so well known under the name of "refined petroleum or kerosene oil" that they need no description.

After the oil running from the condenser has reached about sixty per cent. of the petroleum put into the still the products of distillation begin to come over thicker in body, containing constantly-increasing quantities of paraffine. If the distillation be continued rapidly, the oil finally comes over so heavy in gravity and thick in body as to be unsuitable for burning purposes. This oil is known to the trade as "paraffine oil," and is used extensively as lubricating-oil for machinery.

Attempt has been made to utilize the above-named heavy products for illuminating purposes by "cracking" them up into a light thin oil resembling kerosene, or by mixing them with naphthas, and again distilling to make a cheap illuminating-oil; but such mixtures are poor in quality and extremely dangerous to use.

Oils made from petroleum and coal, shale, and schist have been burned in Argand and similar lamps, when such oils have been so distilled as to simply remove those portions that are readily removed by steam, or by boiling water put into the still with the petroleum or coal oil. The quantity removed usually varies from ten to fifteen percentum in coal and shale oil. When heated by steam—that is, by simply steaming the oil—the amount of light products that can be removed is, with coal and shale, from ten to fifteen per cent., and from petroleum, from fifteen to twenty-five per cent. The whole of the remaining portion will burn poorly in Argand or button lamps.

I am not aware that any attempt has been made to burn in lamps and for illuminating purposes the heavy oils—that is, oils which represent only the last twenty-five to forty per cent. of the distillates of coal, shale, and petroleum oils. The heavy oil is rich in carbon, but will not burn satisfactorily in the ordinary lamps, such as are used for burning kerosene oil. It rapidly crusts the wick, and smokes so badly as to be impracticable as an illuminating material. The heavy oil as made by a process patented May, 1869, by Joshua Merrill, of Boston, is of so fixed a character that it will not ignite until heated to a temperature of 400° Fahrenheit.

I have discovered that distillates of coal, shale, and petroleum oils weighing heavier than 38° Baumé, which, being collected in suitable tanks and chilled and pressed, and the solid paraffine removed by well-known pro cesses, weighs from 28° to 36° Baumé at 60° Fahrenheit, and is heavy and oily in body, having also a high distilling-point, nearly 600° Fahrenheit, and an igniting-point about 300° Fahrenheit, can be burned continuously in a lamp and with a wick, to produce a brilliant, white, and beautiful flame, under the following conditions combined, to wit:

First, the oil should be maintained, while burning, at a temperature of from 100° to 250° Fahrenheit. At this temperature the oil acquires sufficient fluidity to ascend the wick by capillary action.

Second, the wick should be cylindrical, or so shaped as to produce a circular or otherwise equivalent flame, whether continuous or not.

Third, there should be artificial draft, so as to supply atmospheric air to the flame both internally and externally.

I do not claim any particular apparatus. Indeed, any lamp which is arranged so as to heat the burning material in its reservoir, whether by heat applied to the vessel from without or from within—*i. e.*, by transmission of the heat generated by the burner itself—and is provided with a round or equivalent wick-tube, and with appliances to produce an internal and external draft, will more or less answer the purpose, according to the arrangement and particular adaptation of the devices for producing the functions described.

To obtain oil possessing the above characteristics I take the heavy products of distillation above referred to, and preferably that portion of said products intermediate between the kerosene and the very heavy lubricating-oil. This portion of said products, which is really a combination or mixture of such heavy oils and varying densities and boiling-points as pass over under the influence of the higher temperatures, I redistill, the resulting vapors being passed through a condenser and liquefied in the usual way.

Among other advantages attending the use of this oil as a burning-fluid is, that it is so fixed, having an igniting-point of about 300° Fahrenheit, that it is perfectly safe and free from all danger of explosion, or such accidents as daily occur in the use of the light products known as "kerosene." It is also very economical, as it burns much longer than the same quantity of ordinary kerosene oil.

This oil is as safe to use in railroad-cars, factories, and other places as the best sperm-oil, and is perfectly free from tendency to explode—a source of great destruction of life and property. In many States the use of kerosene oil as an illuminating material is prohibited by law in railroad-cars, owing to its inflammable character, which, in case of accident to the cars, at once involves the passengers in great danger of being burned. The heavy oil described is so safe that it would not ignite any more than sperm or lard oil, and if the lamp should be thrown down in which it was burning and the oil become spilled it would not catch fire, but the flame would be immediately extinguished by the fall of the lamp.

This oil, by reason of its high igniting and distilling points, and its greater density as compared with ordinary illuminating-oils, may be properly termed a "heavy illuminating-oil."

Having thus fully described my invention, and the manner in which the same is or may be carried into practical operation, I would state my claim as follows:

A heavy illuminating-oil derived from petroleum, coal, shale, or schist, possessing an igniting-point of about 300° Fahrenheit and a distilling-point of about 600° Fahrenheit, substantially as set forth.

In testimony whereof I have hereunto signed my name this 2d day of April, A. D. 1879.

RUFUS S. MERRILL.

Witnesses:
JOHN B. GOODRICH,
CHAS. H. PLIMPTON.